Patented Nov. 5, 1946

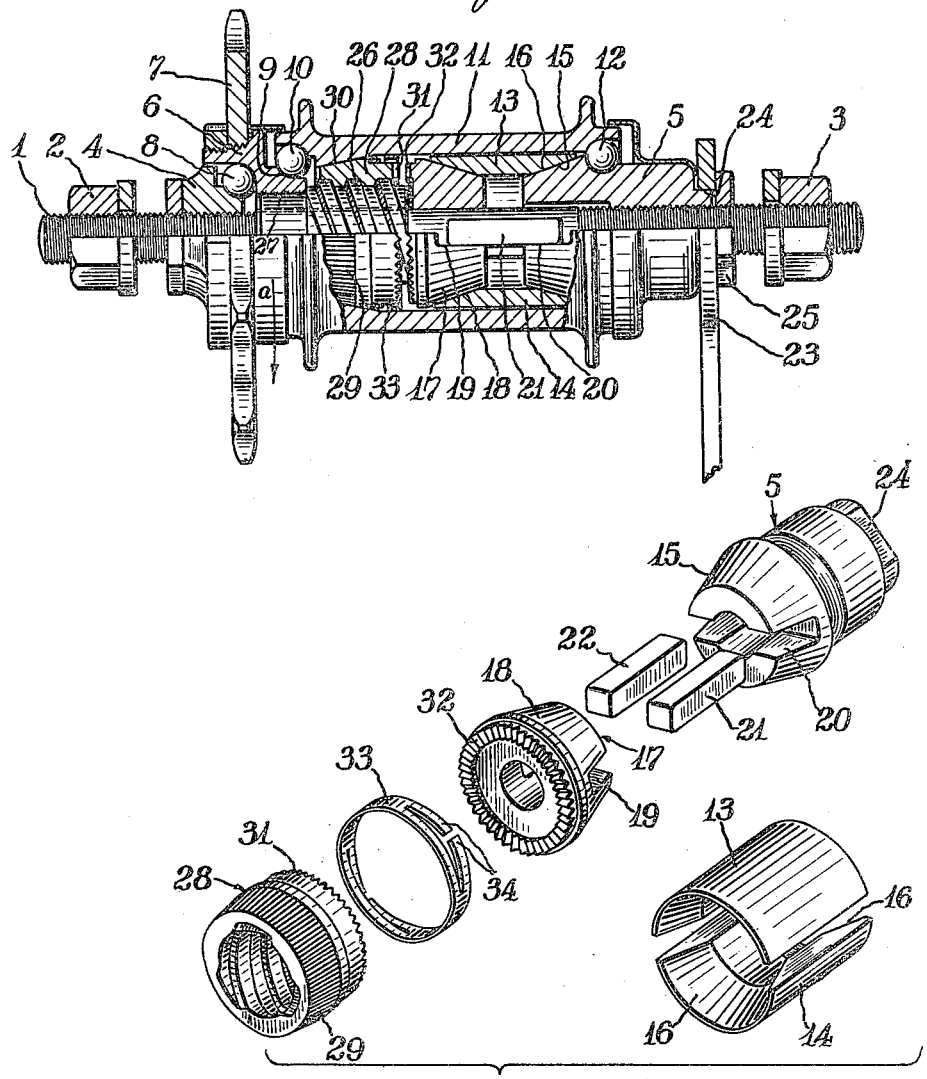

2,410,785

UNITED STATES PATENT OFFICE 2,410,785

COASTER BRAKE

Edwin Elliott Hood, Elmira, N. Y., assignor to Bendix Aviation Corporation, Elmira Heights, N. Y., a corporation of Delaware Application November 3, 1944, Serial No. 561,731

7 Claims. (Cl. 192—6)

The present invention relates to a coaster brake for velocipedes and the like and more particularly to a back-pedaling hub brake.

It is an object of the present invention to provide a novel coaster brake which is efficient and reliable in operation and simple and rugged in construction.

It is another object to provide such a device which provides a large area of surface contact between the braking members, the braking surfaces being at the greatest possible radial distance from the axis of the wheel hub.

It is another object to provide such a device in which the braking elements are all anchored positively against rotation.

It is a further object to provide such a device incorporating a cylindrical brake sleeve which is divided into a plurality of parts that are expanded into frictional engagement with the interior of the wheel hub.

It is another object to provide such a device in which the means for expanding the brake sleeve have a large area of surface contact therewith so as to provide low unit pressures between the parts, thus securing easy operation and obviating the likelihood of sticking of the brake parts.

It is a further object to provide such a device in which the brake sleeve is formed with an interior surface which substantially fits the interior surface of the wheel hub, and the expanding means for the brake sleeve are in the form of conical members which conform closely with conical interior surfaces of the sleeve when the sleeve is expanded into engagement with the hub.

Another object is to provide such a device incorporating means for ensuring immediate actuation of the brake without lost motion.

Another object is to provide such a device in which the brake expanding member is confined closely to its operative position, while being permitted only sufficient longitudinal movement to perform its controlling function.

Further objects and advantages will be apparent from the following description taken in connection with the accompanying drawings in which:

Fig. 1 is a side elevation partly broken away and in section of a preferred embodiment of the invention;

Fig. 2 is an exploded detail view of the brake sleeve and the operating mechanism therefor.

Figure 3:
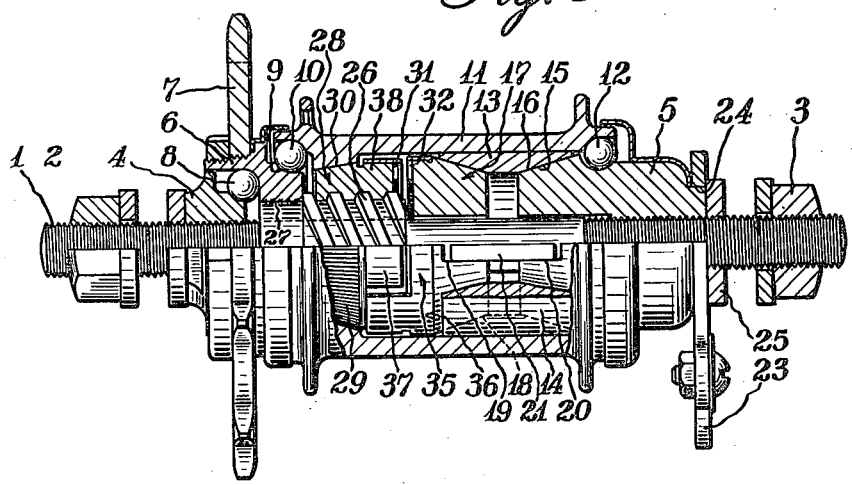
Fig. 3 is a view similar to Fig. 1, showing an embodiment of the invention which incorporates a different form of retarder for the threaded clutch member.

In Fig. 1 of the drawings there is illustrated an axle 1 threaded at its ends for the reception of clamping nuts 2 and 3, a bearing cone member 4 and a bearing cone and anchor member 5. A driving member 6 having a sprocket 7 fixedly mounted thereon is journalled on the cone member 4 by means of bearings 8, and is provided with a bearing race 9 for the reception of bearings 10.

A wheel hub 11 is journalled on the bearings 10 at one end and at the other end on bearings 12 which cooperate with the anchor member 5. A brake sleeve comprising two substantially semi-cylindrical parts 13, 14 is provided with an exterior surface which fits the interior cylindrical surface of the hub 11. The anchor member 5 is provided with a conical portion 15 which extends within and supports the brake sleeve, the adjacent ends of the brake sleeve members 13, 14 being conically flared as indicated at 16 so as to substantially fit the conical extension 15. A conical brake applying expander member 17 for the brake sleeve is slidably journalled on the axle 1 in position to enter the opposite end of the brake sleeve which is conically flared as shown at 18 to conform therewith. The expander member 17 and the anchor member 5 are provided with corresponding axially extending recesses 19 and 20 respectively, and splines or keys 21 and 22 are arranged to slidably fit at their ends in said recesses so as to prevent relative rotation between the expander member and anchor member. The splines 21 and 22 are located between the brake sleeve members 13, 14 so as to also prevent rotation of the sleeve members while permitting relative longitudinal movement of the brake actuating parts. Rotation of the anchor member 5 is prevented by means of a brake arm 23 which is clamped on the flatted extremity 24 of the anchor member by means of a nut 25 threaded on the axle 1, the arm 23 being connected to the frame of the vehicle, not illustrated, in any suitable manner.

The driving member 6 is provided with a screw threaded extension 26 fixed thereto in any suitable manner as by means of a brazed connection 27 and extending into close proximity to the expander member 17 so as to limit longitudinal movement thereof to the left in Fig. 1. A clutch and brake actuating member 28 is threaded on the extension 26 of the driving member and is provided at one end with a conical clutch surface 29 adapted to engage a corresponding clutch surface 30 in the interior of the hub 11. The opposite end of the member 28 is provided with teeth 31 which are adapted to engage a set of teeth 32 formed on the adjacent end of the brake expander member 17.

In order to ensure traversal of the clutch and brake actuating member 28, detent means is provided for frictionally connecting said member with the interior of the hub. As best shown in Fig. 2, this means comprises a ring member 33 mounted on the member 28 and connected therewith in any suitable manner as by spot welding. Ring 33 is provided with arms 34 which are sprung outwardly so as to rub lightly on the interior of the hub 11 to thereby provide a frictional connection therewith.

In operation, forward rotation of the driving member 6 in the direction of the arrow a causes the clutch member 28 to be urged to the left in Fig. 1 to close the clutch 29, 30 between said clutch member and the hub 11 whereby the hub is caused to rotate with the driving member 6. When the operator stops rotating the driving member, further rotation of the hub 11 by momentum causes the clutch member 28 to overrun the screw shaft 26, thus releasing the clutching engagement between the clutch member 28 and the hub. Further overrunning of the hub 11 is transmitted frictionally through the drag ring 33 to the clutch member thus causing it to be traversed to the right in Fig. 1 until the teeth 31 thereof engage the teeth 32 of the expander member 17, after which the clutch member 28 is locked from rotation by reason of such clutching engagement.

If the operator should turn the driving member 6 backward under these circumstances, the backward rotation of the screw shaft 26 moves the clutch member 28 further to the right, which motion is transmitted to the expander member 17 to thereby expand the brake members 13, 14 into frictional engagement with the interior of the hub 11. Since the expander member 17, and the brake shoes 13, 14 are non-rotatably connected to the anchor member 5 by means of the splines 21, 22, the braking torque is transmitted thereby to the anchor member 5 and through the arm 23 to the frame of the vehicle. Inasmuch as the clutch member 28 is moved into engagement with the expander member 17 as soon as the operator stops pedaling as above described, there will be no lost motion between those parts in the application of the brake, and braking will be initiated substantially instantaneously upon backward rotation of the driving member 6 by the operator.

The inclination of the cones 15 and 18 is such that when the longitudinal pressure of the member 17 is relieved by the operator, the surfaces readily disengage without sticking. This result is facilitated by the described arrangement in which the conical surfaces of the members 5 and 17 substantially fit the internally flared ends of the brake members at the time the brake members are expanded into engagement with the hub. The abutment formed by the end of the screw shaft 26 holds the expander member 17 in proper engagement with the keys 21, 22, and prevents the expander from adhering to or following the clutch member 28 when it moves to the left to engage and drive the hub.

Figure 4:
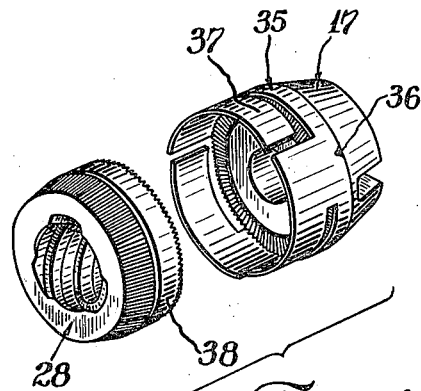
Fig. 4 is a detail in perspective of the clutch and brake expanding members with the retarder for the clutch member, shown in disassembled relation.

In Figs. 3 and 4 of the drawings there is illustrated an embodiment of the invention in which the means for ensuring traversal of the control nut 28 are anchored so as to be prevented from rotation. In these figures, the elements of the hub and braking mechanism are the same as in the embodiment of the invention illustrated in Figs. 1 and 2 and are similiarly numbered. In the present structure, however, a frictional retarding member in the form of an annulus 35 is anchored to the brake expander 17 in any suitable manner as by spot welding or crimping as indicated at 36. The annulus is provided with elastic arms 37 which extend beyond the expander 17 and are arranged to bear frictionally on the cylindrical exterior surface 38 of the clutch member 28 so as to apply a slight frictional drag thereto.

In the operation of this embodiment of the invention forward rotation of the sprocket 7 is transmitted through the driving member 6 to the screw threaded extension 26 thereof, and since the clutch member 28 is initially prevented from rotation by the retarder 35, it is translated longitudinally to the left into engagement with the clutch surface 30 in the interior of the hub 11. The rotation of the sprocket is then transmitted directly to the hub to propel the vehicle. When the rotation of the sprocket 7 is arrested, the rotation of the hub 11 causes the clutch member 28 to overrun the screw shaft 26 slightly so as to move to the right sufficiently to disengage itself from the hub. The hub is then free to overrun or coast by the momentum of the vehicle.

When it is desired to retard or arrest the motion of the vehicle, backward rotation of the sprocket 7 rotates the screw shaft 26 backward whereby the clutch member 28 is translated to the right by virtue of the retarding action of the member 35 until the dentals 31 of the clutch member 28 engage the corresponding teeth 32 of the expander 17. Further backward motion of the sprocket 7 causes the expander 17 to be moved to the right to force the brake shoes 13 into frictional engagement with the interior of the hub 11 to thereby oppose rotation thereof.

Although certain embodiments of the invention have been shown and described in detail, it will be understood that other embodiments are possible and that various changes may be made in the design and arrangement of the parts without departing from the spirit of the invention as defined in the claims appended hereto.

What is claimed is:

1. In a coaster brake a fixed axle, a driving member journalled thereon, an anchor member non-rotatably mounted on the axle having a longitudinally extending recess therein, a wheel hub journalled on the driving member and the anchor member, a split sleeve brake member formed to engage the interior of the hub, an expander for the brake sleeve slidably mounted on the axle and having a longitudinally extending recess in alignment with the recess in the anchor member, a straight key slidably seated in said recesses and non-rotatably engaging the brake sleeve to thereby prevent relative rotation between the expander, brake sleeve and anchor member, and a clutch and brake actuating member threaded on the driving member for longitudinal movement thereon alternatively into engagement with the hub or with the brake expander.

2. A coaster brake as set forth in claim 1 in which said driving member is arranged to engage the expanding member and form an abutment therefor on the axle to limit the sliding movement of the key in the recesses of the expanding member and anchor member.

3. In a coaster brake an axle, an anchor member adjustably mounted thereon, means preventing rotation of the anchor member, a driving member rotatably mounted on the axle, a wheel hub rotatably mounted on the driving member and anchor member, a clutch member threaded on the driving member and movable by forward rotation of the driving member into driving engagement with the wheel hub, a sectional brake sleeve in the hub formed to fit the interior thereof and having conical openings in its ends, an expander member slidably mounted on the axle in abutting relation with the driving member, said expander and anchor members having conical portions fitting into the ends of the brake sleeve, and having longitudinally extending recesses in said conical portions, and keys slidably seated in said recesses and longitudinally traversing the spaces between the sections of the brake sleeve, thereby forming a splined connection between the anchor member, the expander member and the brake sleeve.

4. A coaster brake as set forth in claim 3 in which the clutch member and expander member are provided with dental clutch faces engagable by backward rotation of the driving member, and including further means for applying a frictional drag on the clutch member to insure its traversal in response to actuation of the driving member, said driving member being arranged to engage the expander member and form an abutment on the axle which limits the sliding movement of the expander member thereon.

5. In a coaster brake a wheel hub having in the interior thereof a conical clutch surface and a cylindrical braking surface, a driving member journalled in one end of the hub and an anchor member journalled in the other end, a brake sleeve member within the cylindrical portion of the hub, a clutch and brake actuating member threaded on the driving member in position to engage the conical clutch surface and rotate the hub, an expanding member for the brake movable by the actuating member upon backward rotation of the driving member to apply the brake, and a key slidably seated in the anchor member and expanding member to form a spline connection therebetween and traversing the brake sleeve to thereby form an abutment preventing rotation thereof.

6. In a coaster brake, a fixed axle, a driving member journalled thereon, an anchor member non-rotatably mounted on the axle having a plurality of longitudinally extending recesses therein, a wheel hub journalled on the driving member and the anchor member, a brake applying member slidably mounted on the axle and having longitudinally extending recesses in alignment with the recesses in the anchor member, a plurality of braking elements between the anchor and brake applying members for frictionally resisting rotation of the hub, means for transmitting the braking torque from said elements to the anchor member including a plurality of straight keys slidably seated at their ends in said aligned recesses and non-rotatably engaging the braking elements, and a clutch and brake actuating member threaded on the driving member for longitudinal movement thereon alternatively into engagement with the hub or the brake applying member.

7. A coaster brake as set forth in claim 6 in which the braking elements, the keys and the recesses in the anchor member and brake applying member are so formed and proportioned that the braking elements and keys are free to move longitudinally during the application of the brake and thereby adjust themselves to avoid localized pressure.

E. ELLIOTT HOOD.